United States Patent
Benkoski et al.

(10) Patent No.: US 12,286,556 B2
(45) Date of Patent: Apr. 29, 2025

(54) LOW SOLAR ABSORPTANCE COATINGS

(71) Applicant: The Johns Hopkins University, Baltimore, MD (US)

(72) Inventors: Jason J. Benkoski, Catonsville, MD (US); Rengaswamy Srinivasan, Ellicott City, MD (US); Christopher M. Hoffman, Jr., Odenton, MD (US); Keith S. Caruso, Catonsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 496 days.

(21) Appl. No.: 17/747,286

(22) Filed: May 18, 2022

(65) Prior Publication Data

US 2022/0332975 A1    Oct. 20, 2022

Related U.S. Application Data

(62) Division of application No. 16/807,227, filed on Mar. 3, 2020, now Pat. No. 11,447,659.

(60) Provisional application No. 62/865,401, filed on Jun. 24, 2019.

(51) Int. Cl.
| | | |
|---|---|---|
| C09D 183/04 | (2006.01) | |
| C08K 3/22 | (2006.01) | |
| C08K 3/26 | (2006.01) | |
| C09D 5/33 | (2006.01) | |
| C09D 7/40 | (2018.01) | |

(52) U.S. Cl.
CPC .......... *C09D 183/04* (2013.01); *C09D 5/004* (2013.01); *C09D 7/68* (2018.01); *C08K 3/22* (2013.01); *C08K 2003/2241* (2013.01); *C08K 2003/2296* (2013.01); *C08K 3/26* (2013.01); *C08K 2003/265* (2013.01); *C08K 2201/003* (2013.01)

(58) Field of Classification Search
CPC ........ C09D 5/004; C09D 183/04; C08K 3/16; C08K 3/22; C08K 3/26; C08K 2003/162; C08K 2003/166; C08K 2003/265; C08K 2003/2296
USPC .................. 428/447, 448, 450; 525/477–479
See application file for complete search history.

(56) References Cited

U.S. PATENT DOCUMENTS

| | | | | |
|---|---|---|---|---|
| 5,589,274 A | * | 12/1996 | Long | H01B 1/20 |
| | | | | 428/924 |
| 6,354,620 B1 | * | 3/2002 | Budden | C09D 183/04 |
| | | | | 442/99 |
| 7,560,515 B2 | * | 7/2009 | Tansey | C08L 27/06 |
| | | | | 525/239 |
| 2008/0158663 A1 | | 7/2008 | Su et al. | |
| 2013/0011617 A1 | | 1/2013 | Tasaki et al. | |
| 2015/0275045 A1 | * | 10/2015 | Adachi | C08K 5/0091 |
| | | | | 427/314 |
| 2015/0337189 A1 | | 11/2015 | Takanashi et al. | |
| 2015/0337190 A1 | | 11/2015 | Cook et al. | |
| 2015/0361663 A1 | | 12/2015 | Kaneko et al. | |
| 2018/0016791 A1 | | 1/2018 | Tselepis | |
| 2018/0105692 A1 | | 4/2018 | Imaizumi et al. | |
| 2018/0180331 A1 | * | 6/2018 | Yu | F24S 70/60 |
| 2019/0031886 A1 | * | 1/2019 | Benkoski | C09D 7/65 |
| 2023/0158786 A1 | * | 5/2023 | Yang | D06N 3/0036 |
| | | | | 428/216 |
| 2024/0199842 A1 | * | 6/2024 | Igarashi | C08K 3/16 |

FOREIGN PATENT DOCUMENTS

| | | |
|---|---|---|
| KR | 10-1262125 B1 | 5/2013 |
| KR | 10-1392815 B1 | 5/2014 |
| WO | 2012134788 A1 | 10/2012 |
| WO | WO 2013/024884 * | 2/2013 |

OTHER PUBLICATIONS

Author Unknown, Technical Data Sheet, DOWSIL 2405 Resin, Copyright Date 2017, downloaded from Dow website in parent case on Aug. 12, 2021.
Author Unknown, Sci Finder Substance Detail, CAS Registry No. 308073-87-2, Dowsil 2405, accessed in parent case from Sci Finder on Aug. 12, 2021.
Author Unknown, "Compound Summary Methylsilsesquioxane," Pubchem, https://pubchem.ncbi.nlm.nih.gov/compound/Methylsilsesquioxane, eight page website printout, accessed in parent case on Feb. 28, 2022.

* cited by examiner

*Primary Examiner* — Marc S Zimmer
(74) *Attorney, Agent, or Firm* — Noah J. Hayward

(57) ABSTRACT

Coating compositions include a binder that has a first polymeric material that does not undergo ultraviolet (UV) degradation and/or does not absorb UV radiation/light. The coating compositions may further include at least a first UV-reflective pigment dispersed throughout the binder. The coating compositions may be provided in a cured form as a solid coating layer that may overly at least a portion of a substrate.

18 Claims, 6 Drawing Sheets

LOW SOLAR ABSORPTANCE COATINGS

CROSS-REFERENCE TO RELATED APPLICATIONS

This application is a divisional of U.S. Nonprovisional patent application Ser. No. 16/807,227 filed on Mar. 3, 2020, which claims the benefit of and priority under 35 U.S.C. § 119(e) to prior-filed, U.S. Provisional Patent Application No. 62/865,401 filed on Jun. 24, 2019, now expired, the entire contents of which are expressly incorporated by reference herein.

STATEMENT OF GOVERNMENTAL INTEREST

This invention was made with Government support under contract number N00014-14-1-0472 awarded by the Office of Naval Research (ONR). The Government has certain rights in the invention.

TECHNICAL FIELD

Example embodiments of the invention relate generally to coating compositions including a binder that comprises (i) a first polymeric material that (a) does not undergo ultraviolet (UV) degradation, (b) does not absorb UV radiation/light, or (c) both of (a) and (b), and (ii) at least a first UV-reflective pigment dispersed throughout the binder. The coating composition may be provided in cured form as a solid coating layer that may overly at least a portion of a substrate. Embodiments of the invention also relate to method of making a coating composition and methods of treating a substrate.

BACKGROUND

Sunlight at ground-level incorporates incident radiation in the ultraviolet, visible, and infra-red regions with wavelengths spanning from about 300 nm to about 3000 nm. Any surface of an object, such as a building, plane, or ship, that absorbs part or all of the solar spectrum (e.g., wavelengths from about 300 nm to about 3000 nm) from incoming sunlight will undergo an increase in surface temperature relative to the ambient temperature that may undesirably propagate to the interior of the object (e.g., a building, plane, or ship).

BRIEF SUMMARY

Certain example embodiments according to the invention provide a coating composition (e.g., a liquid or flowable coating composition) including a binder that comprises a first polymeric material that (a) does not undergo ultraviolet (UV) degradation, (b) does not absorb UV radiation/light, or (c) both of (a) and (b). The coating composition may also include at least a first UV-reflective pigment dispersed throughout the binder.

In another aspect, embodiments of the present invention provide a solid coating comprising a cured form of a coating composition, wherein the coating composition includes the combination of (i) a binder that comprises a first polymeric material that (a) does not undergo ultraviolet (UV) degradation, (b) does not absorb UV radiation/light, or (c) both of (a) and (b), and (ii) at least a first UV-reflective pigment dispersed throughout the binder.

In another aspect, embodiments of the present invention provide a method of making a coating composition (e.g., a liquid of flowable composition). The method of making a coating composition may include providing a binder that comprises a first polymer material that (a) does not undergo ultraviolet (UV) degradation, (b) does not absorb UV radiation/light, or (c) both of (a) and (b). The method may also include dispersing at least a first UV-reflective pigment throughout the binder.

In another aspect, embodiments of the present invention provide a method of treating a substrate. The method of treating a substrate may include applying a layer of a coating composition onto the substrate, in which the coating composition includes the combination of (i) a binder that comprises a first polymeric material that (a) does not undergo ultraviolet (UV) degradation, (b) does not absorb UV radiation/light, or (c) both of (a) and (b), and (ii) at least a first UV-reflective pigment dispersed throughout the binder. The method may also include actively curing the coating composition or passively allowing the coating composition to cure.

BRIEF DESCRIPTION OF THE DRAWINGS

Embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
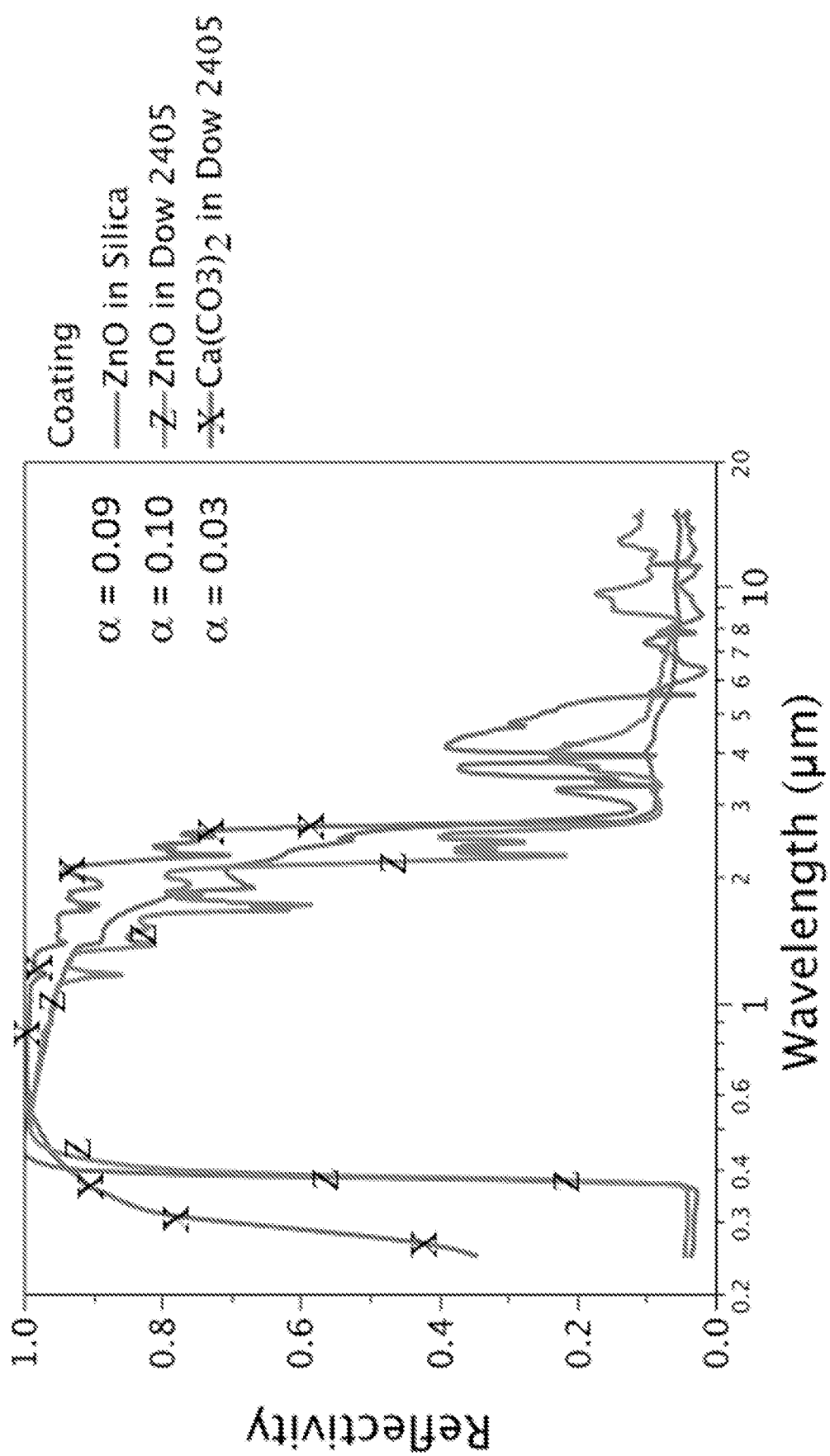
FIG. 1 shows reflectivity spectra for cured coating layers in accordance with certain embodiments of the invention.

Example embodiments of the invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Certain embodiments of the invention provide a coating composition that can be actively or passively cured to provide a coating layer (e.g., in solid form) that remains near ambient temperature even in direct sunlight. The coating composition, for example, can be coated onto a variety of substrates and either actively cured or passively allowed to cure to form a coating layer attached to the substrate. Such a solid coating, for example, remains near ambient temperature even in direct sunlight by reflecting, for example, the entire solar spectrum of light (e.g., ultraviolet light, visible light, and near-infrared light) and emitting or absorbing infrared light efficiently at wavelengths longer than 3 μm. For objects near room temperature, for instance, radiative emission is almost entirely at wavelengths longer than 3 μm while solar radiation is almost entirely at wavelengths shorter than 3 μm. In accordance with certain embodiments of the invention, therefore, the solid coating may be highly reflective, such as from 70-100% reflective, up to 3 μm and then highly absorbing (and therefore emissive), such as from 70% to 100% absorbing, at longer wavelengths (e.g., greater than 3 μm). In accordance with certain embodiments of the invention, a reflectivity spectrum for the solid coating should resemble a step-function with a notably higher reflectivity % within wavelengths from at least about 0.4 μm to about 3 μm, such as at least about any of the following: 0.4, 0.5, 0.6, 0.7, 0.8, 0.9, and 1 μm and/or at most about any of the following: 3, 2.8, 2.5. 2.2, 2, 1.8, 1.5, 1.2, 1, and 0.8 μm as compared to wavelengths larger than 3 μm. In accordance with certain embodiments of the invention, the solid coating layer may protect substrates coated with the solid coating layer from getting too hot when exposed to sunlight.

In accordance with certain embodiments of the invention, the selectively reflective solid coating may comprise a pigment that is highly transparent in the ultraviolet (UV) (e.g., 100-400 μm), visible (e.g., 400-700 nm), and near-infrared bands (e.g., 700-3000 nm), but has a high refractive index, so that it strongly scatters light and consequently reflects the solar spectrum. In accordance with certain embodiments of the invention, the pigment may comprise or consist of a pigment(s) that is transparent to a larger portion of the ultraviolet band than $TiO_2$, which is more commonly used in white paints, such as ZnO. In accordance with certain embodiments of the invention, the average particle size of the pigment is larger than those used when only trying to make a visibly white paint. In this regard, near-infrared light is much harder to reflect than visible light due to the longer wavelengths. Near-infrared light is also harder to reflect because these larger particles, by virtue of being bigger, may require a thicker coating in order to have enough scatterers to fully reflect near-infrared light. Note that about 55% of the Sun's energy lies in these longer wavelengths that cannot be seen by the naked eye.

In accordance with certain embodiments of the invention, the coating composition and resulting solid coating layer comprising a cured form of the coating composition may include a binder (e.g., a polymeric binder) that is also transparent in the visible spectrum (e.g., 400-700 nm), but strongly absorbing at wavelengths longer than 3 μm. For instance, the transparent nature of the binder across the solar spectrum (e.g., 100-2500 nm) allows the solar radiation to reach and subsequently scatter or reflect back from the pigment that is dispersed throughout the binder. In accordance with certain embodiments of the invention, for example, the binder may comprise or consist of a polymeric material that does not undergo UV degradation and/or does not absorb UV radiation, such as a methyl polysiloxane (e.g., polydimethylsiloxane) that is transparent at UV wavelengths and does not require UV-absorbing pigments to protect it from UV damage. When such a binder is combined with a UV-reflective pigment, in accordance with certain embodiments of the invention, the resulting coating layer allows for greater reflection of the UV band, which comprises approximately 5% of the Sun's energy. In accordance with certain embodiments of the invention, the solid coating can reflect even more UV light by incorporating an overcoat of calcium carbonate-loaded polysiloxane. Due to the lower refractive index of calcium carbonate, for instance, the overcoat may be semi-porous in nature and thus more efficient at scattering light to be effective.

As noted above and discussed in more detail below, the pigment(s), such as ZnO and $CaCO_3$, in accordance with certain embodiments of the invention do not absorb UV light as strongly as $TiO_2$. Additionally, the use of larger particle sizes for the pigment(s) provides improved scattering of near-infrared light particularly when coupled with binders that are more UV transparent and do not require UV-protecting dyes. In accordance with certain embodiments of the invention, the coating composition may also comprise organic dyes that are transparent in the near-infrared band, but have visible light absorption.

As used herein, the phrase "does not undergo ultraviolet (UV) degradation" refers to a polymeric material that does not undergo photo-oxidative degradation resulting in the breaking of polymer chains that produce radicals and reduce the average molecular weight of the polymeric material. For instance, the phrase "does not undergo ultraviolet (UV) degradation" may refer to a polymeric material that does not undergo further oxidation upon exposure to UV radiation. In accordance with certain embodiments of the invention, for example, the polymeric material may comprise a siloxane having a backbone formed from Si—O—Si bonds.

As used herein, the phrases "does not absorb UV radiation/light" and "UV transparent" refer to a polymeric material that absorbs less than 10% (e.g., less than 8%, 6%, or 4%) of radiation across the UV waveband spanning from 100 to 400 nm.

As used herein, the phrase "UV-reflective pigment" refers to a pigment that is highly transparent to in the ultraviolet (UV) (e.g., 100-400 nm), visible (e.g., 400-700 nm), and near-infrared bands (e.g., 700-3000 nm), but has a high refractive index, so that it strongly scatters light and consequently reflects the solar spectrum. In accordance with certain embodiments of the invention, for instance, the pigment may comprise a transparency value from at least 90% transmittance to about 100% transmittance across at least a majority of wavelengths from 100 nm to 3000 nm, such as at least about any of the following: 90, 91, 92, 93, 94, and 95% transmittance across at least a majority of wavelengths from 100 nm to 3000 nm and/or at most about any of the following: 100, 99, 98, 97, 96, and 95% transmittance across at least a majority of wavelengths from 100 nm to 3000 nm. In accordance with certain embodiments of the invention, the term "majority of wavelengths" may mean at least 50% of the wavelengths from 100 nm to 3000 nm, such as at least about any of the following: 50, 60, 70, 80, and 90% of the wavelengths from 100 nm to 3000 nm and/or at most about any of the following: 100, 98, 95, 93, 90, and 80% of the wavelengths from 100 nm to 3000 nm. By way of example only, ZnO will not be transparent all wavelengths from 100 nm to 3000 nm, as ZnO will absorb light below about 300 nm. In this regard, however, ZnO is highly transparent across the waveband from about 3000 nm to about 400 nm (e.g., [(3000 nm-400 nm)/(3000 nm-100 nm)]* 100=90% of the wavelengths from 100 nm to 3000 nm).

In accordance with certain embodiments, the present invention provides a coating composition (e.g., a liquid, sprayable, or flowable coating composition) including a binder that comprises a first polymeric material that (a) does not undergo ultraviolet (UV) degradation, (b) does not absorb UV radiation/light, or (c) both of (a) and (b). The coating composition may also include at least a first UV-reflective pigment dispersed throughout the binder. In this regard, the coating composition may comprise a variety of forms that enable the coating composition to be applied to a substrate for coating. For example, the coating composition may be provided as a suspension (e.g., a solid-in-liquid suspension). In this regard, the UV-reflective pigment(s) may be uniformly dispersed throughout the binder. In accordance with certain embodiments, the viscosity of the coating composition may be modified with one or more surfactants and/or thickeners to tailor the resulting viscosity for an intended coating application technique. For instance, the viscosity and/or surface tension may be modified in a manner that renders the coating composition particularly suitable for application to a substrate by spraying, while a different viscosity and/or surface tension may be desired for application to a substrate by rolling or brushing.

In accordance with certain embodiments of the invention, the first polymeric material does not undergo UV degradation upon exposure to UV radiation. The first polymeric material, in accordance with certain embodiments of the invention, may be devoid of an aromatic functionality. For example, aromatic functional groups including one or more carbon atoms (e.g., benzene rings, etc.) are typically vulnerable to photo-oxidative degradation upon exposure to UV radiation resulting in a "yellowing" of the polymeric material. In accordance with certain embodiments of the invention, the first polymeric material may be devoid of unsaturated bonds. The first polymeric material, in accordance with certain embodiments of the invention, may comprise a backbone that is devoid of carbon atoms. For example, the first polymeric material may comprise a siloxane having a backbone formed from Si—O—Si bonds.

In accordance with certain embodiments of the invention, the first polymeric material may comprise an alkoxy-siloxane. For instance, the first polymeric material may comprise a polysiloxane, such as a methyl-polysiloxane. For example, the methyl-polysiloxane may have Structure (I):

Structure (I)

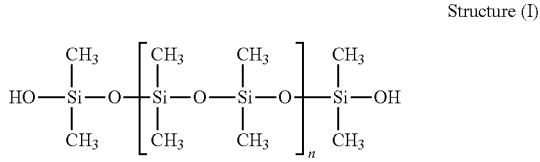

wherein 'n' in accordance with certain embodiments of the invention comprises a value from about 10 to about 100,000, such as at least about any of the following: 10, 50, 100, 250, 500, 1000, 10,000, 25,000, and 50,000 and/or at most about any of the following: 100,000, 90,000, 80,000, 75,000, 60,000, and 50,000. To form a solid material, the polysiloxane must be crosslinked into a percolated three-dimensional network. In this case, Structure (I) represents a chain segment between crosslinks, however, polysiloxane architectures can be more complex in accordance with certain embodiments of the invention. Generally speaking, for instance, a polysiloxane is a macromolecule with a siloxane backbone (—Si—O—). In this regard, the silicon atom can be bonded with 1 to 4 oxygen atoms and 3 to 1 organic pendant groups. The ensuing range in polymer functionality from 1 to 4 makes possible a wide range of geometries that give the polymer a wide range of mechanical properties, such as elastic modulus, strength, and fracture toughness. Non-limiting example architectures include both "ladder polymers" (Structure (II)) with dual siloxane backbones and "cage structures" such as those found in polysilesquioxanes (Structure (III)).

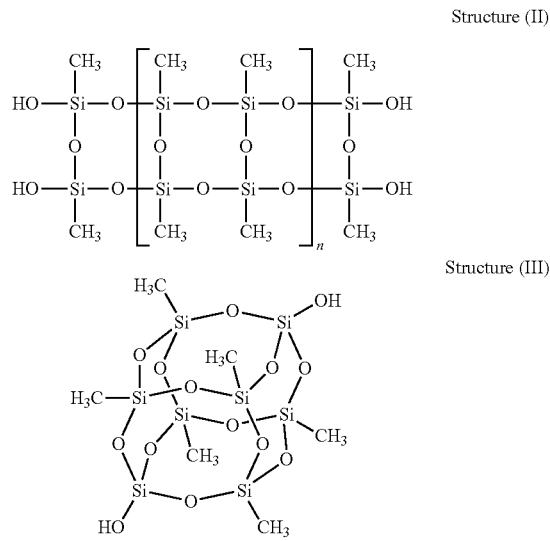

In accordance with certain embodiments of the invention, the methyl groups pendant on the Si atoms can be substituted with higher alkanes such as ethyl, propyl, butyl, isobutyl groups and so on. In accordance with certain embodiments of the invention, aromatic groups such as phenyl groups may be avoided, since these species absorb UV light. Furthermore, aromatic groups undergo UV degradation, which causes permanent yellowing of the material (blue light absorption), which will contribute to solar heating due to the increased absorption of sunlight. In accordance with certain embodiments of the invention, for example, the binder may be devoid of aromatic groups.

In accordance with certain embodiments of the invention, the binder may further comprise a second polymeric material that is different than the first polymeric material. In accordance with certain embodiments of the invention, the second polymeric material may also (a) not undergo UV degradation, (b) not absorb UV radiation/light, or (c) both of (a) and (b). Additionally or alternatively, the second polymeric material may comprise a material that imparts additional flexibility to the coating composition when the coating composition is provided in a cured and/or solid form. Using the above examples, for instance, Structure (I) would be the most flexible, and Structure (III) would be the most rigid. The mechanical properties of the mixture could therefore be tailored for a given application by adjusting the ratio between the two macromolecular components. All three structures may be mixed in any proportion to arrive at the final composition of the polymeric binder.

In accordance with certain embodiments of the invention, the coating composition (e.g., whether in a liquid or solid form) may comprise from about 25% to about 60% by volume of the first polymeric material (e.g., a methyl-polysiloxane), such as at least about any of the following: 25, 30, 35, 40, 45, and 50% by volume of the first polymeric material (e.g., a methyl-polysiloxane) and/or at most about any of the following: 60, 55, 50, 45, and 40% by volume of the first polymeric material (e.g., a methyl-polysiloxane). The first polymeric material, in accordance with certain embodiments of the invention, may account for about 1% to about 100% by volume of a total polymeric content of the coating composition, such as at least about any of the following: 1, 5, 10, 15, 20, 25, 30, 35, 40, 45, 50, 55, and 60% by volume of a total polymeric content of the coating composition and/or at most about any of the following: 100, 98, 95, 92, 90, 85, 80, 75, 70, 65, and 60% by volume of a total polymeric content of the coating composition.

The first UV-reflective pigment, in accordance with certain embodiments of the invention may comprise an inorganic pigment or an organic pigment. In accordance with certain embodiments of the invention, the first UV-reflective pigment may comprise, for example, ZnO or $CaCO_3$. These pigments are preferred over $TiO_2$ due to its strong absorption of UV light. Although $TiO_2$ has a higher refractive index and therefore scatters light more efficiently, its strong absorption of UV light almost up to 400 nm sets an upper limit on the percentage of sunlight that it can reflect. In accordance with certain embodiments of the invention, the UV-reflective pigments such as ZnO, $CaCO_3$, $SiO_2$, $MgF_2$, $CaF_2$, and $Al_2O_3$ all have the potential to reflect a greater fraction of sunlight due to their ability to scatter UV light without absorbing it. In accordance with certain embodiments of the invention, the first UV-reflective pigment and/or the second UV-reflective pigment may independently comprise ZnO, $CaCO_3$, $SiO_2$, $MgF_2$, $CaF_2$, or $Al_2O_3$. In accordance with certain embodiments of the invention, an acceptable tradeoff is that the coatings may have to be somewhat thicker than a $TiO_2$-loaded coating to achieve the same level of opacity. In accordance with certain embodiments of the invention, the coating composition (e.g., whether in liquid or solid form) may further comprise a second UV-reflective pigment. In this regard, the coating composition may include more than one type of pigment, for instance, to refine material handling (e.g., ease of coating, dispersement within the binder, etc.) and/or specific reflectance of wavelengths of interest. By way of example, the coating composition may comprise ZnO as the first UV-reflective pigment and $CaCO_3$ as the second UV-reflective pigment. In accordance with certain embodiments of the invention the coating composition and/or the cured coating layer may comprise a combination of ZnO and $CaCO_3$ in the ratio of x:y, where x may vary from 1 to 99 such as at least about any of the following: 1, 5, 10, 15, 20, 25, 30, 35, 40, 45, 50, 55, and 60 and/or at most about any of the following: 99, 98, 95, 92, 90, 85, 80, 75, 70, 65, and 60%; while y varies from 99 to 1 such as at least about any of the following: 1, 5, 10, 15, 20, 25, 30, 35, 40, 45, 50, 55, and 60 and/or at most about any of the following: 99, 98, 95, 92, 90, 85, 80, 75, 70, 65, and 60%.

In accordance with certain embodiments of the invention, the first UV-reflective pigment and/or the second UV-reflective pigment may have an average diameter from about 0.3 µm to about 2 µm, such as at least about any of the following: 0.3, 0.35, 0.4, 0.5, 0.6, 0.7, 0.8, 0.9, and 1 µm and/or at most about any of the following: 2, 1.8, 1.5, 1.2, 1, 0.8, 0.7, 0.6, and 0.5 µm. In accordance with certain embodiments of the invention, the coating composition or solid coating layer may comprise from about 40% to about 75% by volume of the first UV-reflective pigment or the combination of both the first UV-reflective pigment and the second UV-reflective pigment, such as at least about any of the following: 40, 45, 50, 55, and 60% by volume of the first UV-reflective pigment or the combination of both the first UV-reflective pigment and the second UV-reflective pigment and/or at most about any of the following: 75, 70, 65, 60, and 55% by volume of the first UV-reflective pigment or the combination of both the first UV-reflective pigment and the second UV-reflective pigment.

In another aspect, embodiments of the present invention provide a solid (e.g., non-flowable) coating comprising a cured form of a coating composition, wherein the coating composition includes the combination of (i) a binder that comprises a first polymeric material that (a) does not undergo ultraviolet (UV) degradation, (b) does not absorb UV radiation/light, or (c) both of (a) and (b), and (ii) at least a first UV-reflective pigment dispersed throughout the binder. In accordance with certain embodiments of the invention, the solid coating may comprise a thickness in a z-direction of the solid coating. In accordance with certain embodiments of the invention, the thickness of the solid coating comprises the shortest dimension of the solid coating. For example, the solid coating may be deposited on top of a substrate in an x-y plane in which the thickness in the z-direction is perpendicular to the x-y plane. In accordance with certain embodiments of the invention, the solid coating may comprise a thickness in a z-direction of the solid coating comprising from about 25 µm to about 250 µm, such as at least about any of the following: 25, 50, 75, 100, 125, 150, and 175 µm and/or at most about any of the following: 250, 225, 200, 175, and 150 µm.

Solid coatings, in accordance with certain embodiments of the invention, may comprise an average reflectance from about 80% to about 100%, such as at least about any of the following: 80, 85, 90, and 95% and/or at most about any of the following: 100, 99, 98, 97, 96, 95, 90, and 85%, across wavelengths from about 0.4 µm to about 3 µm, such as at least about any of the following: 0.4, 0.5, 0.6, 0.7, 0.8, 0.9, and 1 µm and/or at most about any of the following: 3, 2.8, 2.5, 2.2, 2, 1.8, 1.5, 1.2, and 1 µm.

In accordance with certain embodiments of the invention, the coating composition and/or solid coating may comprise one or more additional color-imparting pigments that differ from the first UV-reflective pigment and/or the second UV-reflective pigment. For example, additional color-imparting pigments may include a perylene (e.g., perylene black), an anthraquinone (such as EPOLIGHT™ 5821 and EPOLIGHT™ 5843), or any other organic pigment that absorbs visible light, but is transparent to near infrared light (wavelength greater than 700 nm). Inorganic pigments that reflect near infrared light, such as molybdenum and praseodymium doped yttrium cerate, may also be used to create visible color without incurring an unnecessary thermal penalty by absorbing near infrared light that is not visible to the naked eye.

In accordance with certain embodiments of the invention, the coating composition and/or solid coating may comprise a color shift (ΔE) of no more than about 2.5 after 300 hours of QUV exposure as determined in accordance with ASTM G154-16, such as at least about any of the following: 0.5, 0.75, 1, 1.25, and 1.5 after 300 hours of QUV exposure and/or at most about any of the following: 2.5, 2.4, 2.3, 2.2, 2.1, 2.0, 2, 1.8, 1.6, and 1.5 after 300 hours of QUV exposure.

In another aspect, embodiments of the present invention provide a method of making a coating composition (e.g., a liquid of flowable composition). The method of making a coating composition may include providing a binder that comprises a first polymer material that (a) does not undergo ultraviolet (UV) degradation, (b) does not absorb UV radiation/light, or (c) both of (a) and (b). The method may also include dispersing at least a first UV-reflective pigment throughout the binder. In accordance with certain embodiments of the invention, the step of dispersing the at least first UV-reflective pigment throughout the binder may comprise adding the at least first UV-reflective pigment to the pre-cured binder and admixing the at least first UV-reflective pigment throughout the pre-cured binder. As noted above, the viscosity of the coating composition and/or the pre-cured binder may be modified with one or more surfactants and/or thickeners to tailor the resulting viscosity for an intended coating application technique and/or to promote a homogeneous distribution of the UV-reflective pigment(s) throughout the pre-cured binder. For instance, the viscosity and/or surface tension of the pre-cured binder may be modified in a manner that renders the coating composition particularly suitable for application to a substrate by spraying, while a different viscosity and/or surface tension may be desired for application to a substrate by rolling or brushing.

In another aspect, embodiments of the present invention provide a method of treating a substrate. The method of treating a substrate may include applying a layer of a coating composition (e.g., in a liquid or flowable form) onto the substrate, in which the coating composition includes the combination of (i) a binder that comprises a first polymeric material that (a) does not undergo ultraviolet (UV) degradation, (b) does not absorb UV radiation/light, or (c) both of (a) and (b), and (ii) at least a first UV-reflective pigment dispersed throughout the binder. The method may also include actively curing the coating composition or passively allowing the coating composition to cure (e.g., allowed to cure via moisture present in the ambient environment).

In accordance with certain embodiments of the invention, the step of applying the layer of the coating composition may comprise spraying, painting, or rolling the coating composition onto the substrate. The substrate, in accordance with certain embodiments of the invention, may not be particularly limited and can include, for example, a metal, a polymeric-composite, a natural or synthetic cloth, brick, stone, marble, concrete, or glass. Once applied onto the substrate, the coating composition may be cured or allowed to naturally cure to form a solid coating layer on top of the substrate. In this regard, the invention also provides an article comprising at least one surface coated with a layer of a solid coating. In accordance with certain embodiments of the invention, the article may comprise a land vehicle, an aerospace vehicle, a ship, a building, or a tent.

EXAMPLES

The present disclosure is further illustrated by the following examples, which in no way should be construed as being limiting. That is, the specific features described in the following examples are merely illustrative and not limiting.

FIG. 1 shows reflectivity spectra for a set of cured coating layers in accordance with certain embodiments of the invention. In particular, a first cured coating layer was formed from ZnO dispersed in Silica. A second cured coating layer was formed from ZnO dispersed in Dow 2405, which is a solventless, liquid resin comprising a moisture curing alkoxy siloxane that is devoid of phenyl groups and cures at room temperature. A third cured coating layer was formed from $Ca(CO_3)_2$ dispersed in Dow 2405. As illustrated in FIG. 1, the reflectivity across wavelengths from 0.4 µm to 1 µm was desirably large, while the third cured coating layer formed from $Ca(CO_3)_2$ dispersed in Dow 2405 provided superior reflectance across a broader range of wavelengths (e.g., across 0.3 µm to about 3 µm).

Table 1 below provides a summary of the cured coating layers for each of the cured coating layers formed in the present "Examples" section.

TABLE 1

| Coating | ZnO in Dow 2405 White | CaCO3 in Dow 2405 White | ZnO in Silica White | ZnO Haze Gray | CaCO3 Haze Gray |
|---|---|---|---|---|---|
| Binder | Dow 2405 | Dow 2405 | Kasil 6 SiO₂ | Dow 2405 | Dow 2405 |
| Binder Mass (g) | 24 | 3.77 | 6 | 27 | 23 |
| Pigment Type | ZnO | CaCO3 | ZnO | ZnO | CaCO3 |
| Pigment Mass (g) | 36 | 8.73 | 5 | 33.75 | 24 |
| Pigment Volume Fraction (%) | 59% | 75% | 50% | 47% | 57% |
| Pigment Weight Fraction (%) | 64% | 70% | 68% | 56% | 51% |
| Perylene Black (g) | | | | 0.45 | 0.216 |
| Epolight 5845 (g) | | | | | 0.009072 |
| Epolight 5821 (g) | | | | 0.015 | |
| Epolight 5843 (g) | | | | 0.006 | |

The zinc oxide pigment in this embodiment has a minimum particle size of 0.27 µm and an average particle size of 0.31 µm. The calcium carbonate particle size distribution is similar. In general, near-infrared reflection requires particle sizes ranging from 0.3 to 0.6 µm.

Figure 2:
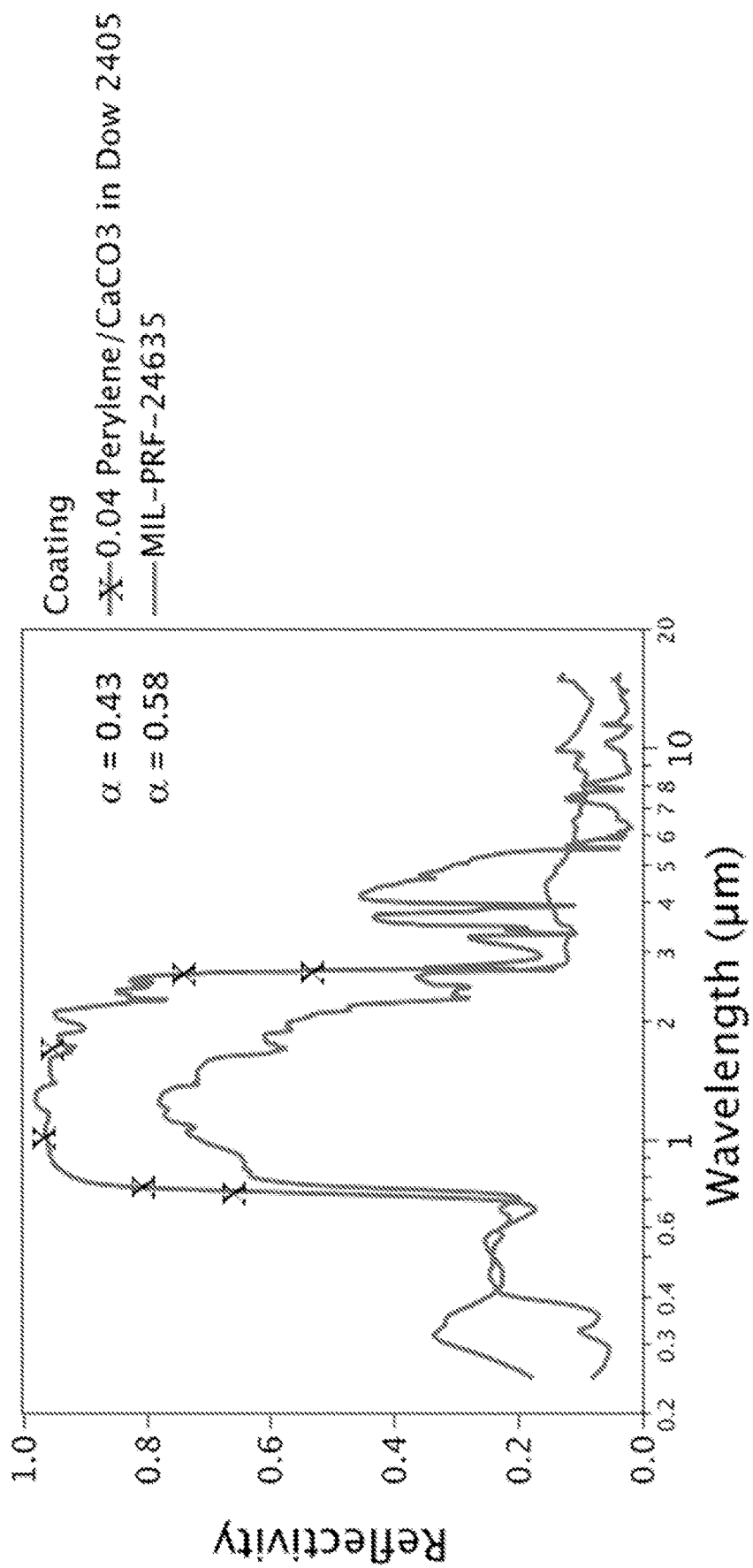
FIG. 2 compares a reflectivity spectrum for a cured coating layer in accordance with certain embodiments of the invention with that of a prior art cured coating layer.

As shown in FIG. 2, a cured coating layer formed from a combination of perylene black and $Ca(CO_3)_2$ pigments dispersed in Dow 2405, in accordance with certain embodiments of the invention, to provide a coating having a hazy grey color. The reflectivity of this cured coating layer was compared to a commercially available coating material, which is identified as "MIL-PRF-24635" in FIG. 2 and also has a hazy grey color. As illustrated by FIG. 2, the reflectivity of the cured coating layer in accordance with certain embodiments of the invention provides significantly greater reflectivity across all wavelengths from about 0.6 µm to about 3 µm. For example, the cured coating layer in accordance with certain embodiments of the invention provided greatly improved near-infrared reflectivity relative to that of "MIL-PRF-24635" (e.g., about 35% lower solar absorption overall for the inventive cured coating layer). Moreover, the inventive cured coating composition may provide a maximum possible temperature reduction of 30° F. in still air and in direct sunlight.

Figure 3:
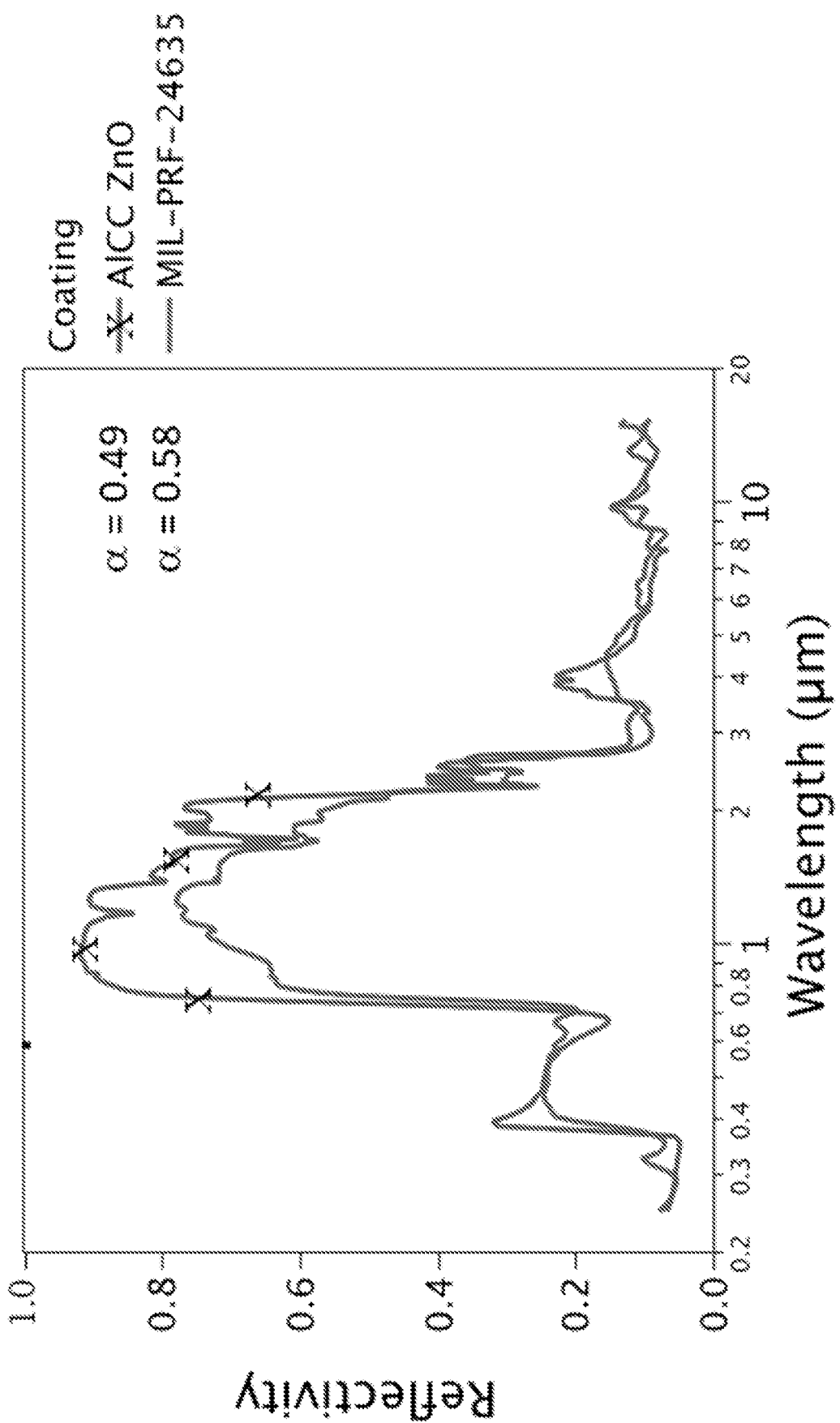
FIG. 3 compares a reflectivity spectrum for another cured coating layer in accordance with certain embodiments of the invention with that of a prior art cured coating layer.

FIG. 3 compares a reflectivity spectrum for another cured coating layer in accordance with certain embodiments of the invention with that of a prior art cured coating layer (i.e., "MIL-PRF-24635"). As shown in FIG. 3, for example, the near-infrared reflectivity using ZnO pigment was still greater than that realized by the comparative coating layer (e.g., about 16% lower absorption overall).

Figure 4B:
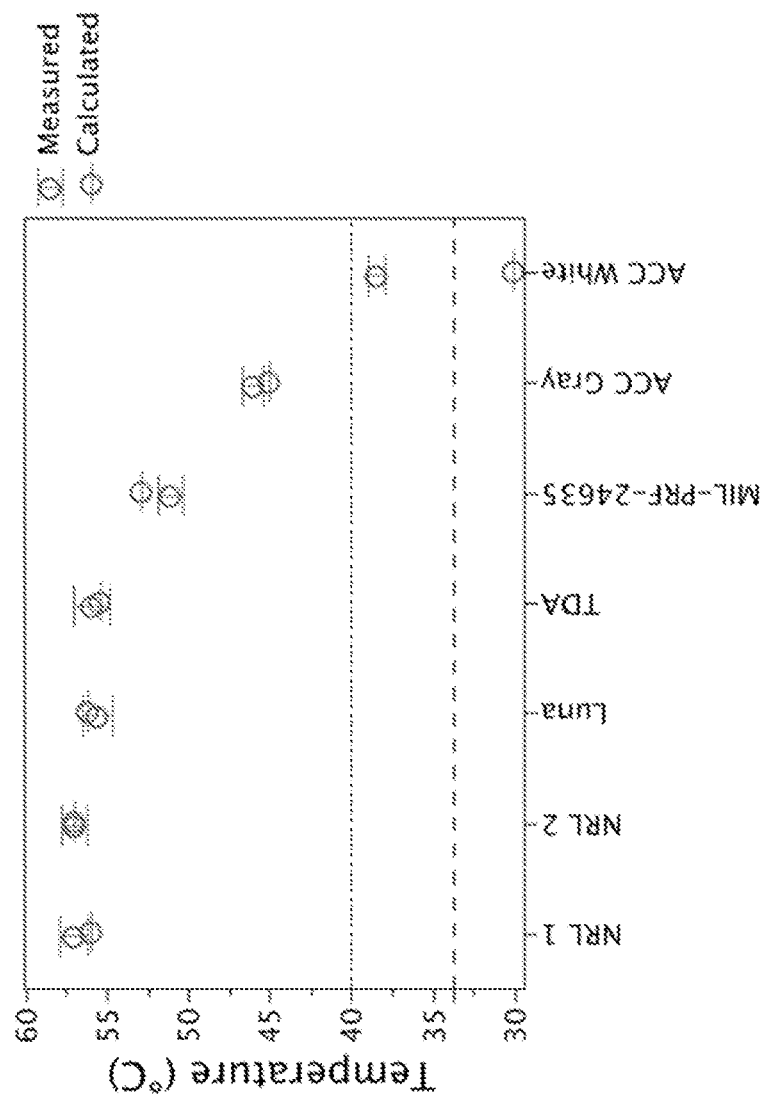
FIG. 4B illustrates the results from the outdoor evaluation shown in FIG. 4A.
Figure 4A:
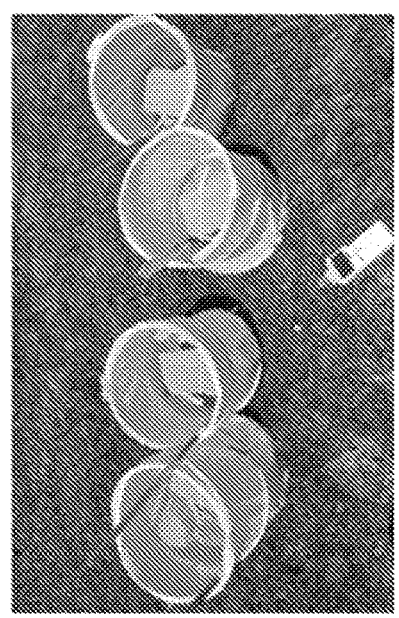
FIG. 4A shows the testing conditions for an outdoor evaluation of various cured coating layers.

As shown in FIG. 4A, several different cured coating layers were formed on aluminum substrates and exposed to direct sunlight on a 33° C. day. FIG. 4B illustrates the results from the outdoor evaluation shown in FIG. 4A, in which samples labeled "ACC Grey" and "ACC White" represent cured coating layers in accordance with certain embodiments of the invention.

Figure 5B:
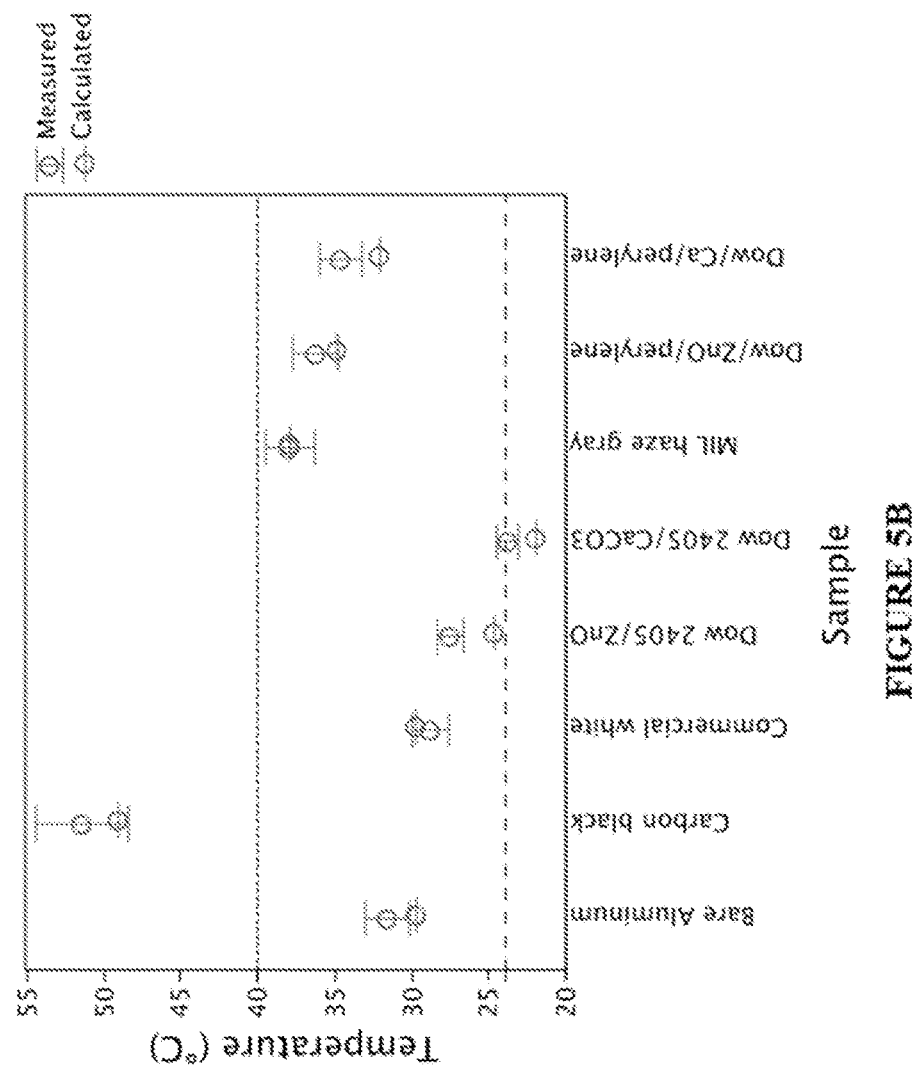
FIG. 5B illustrates the results from the outdoor evaluation shown in FIG. 5A.
Figure 5A:
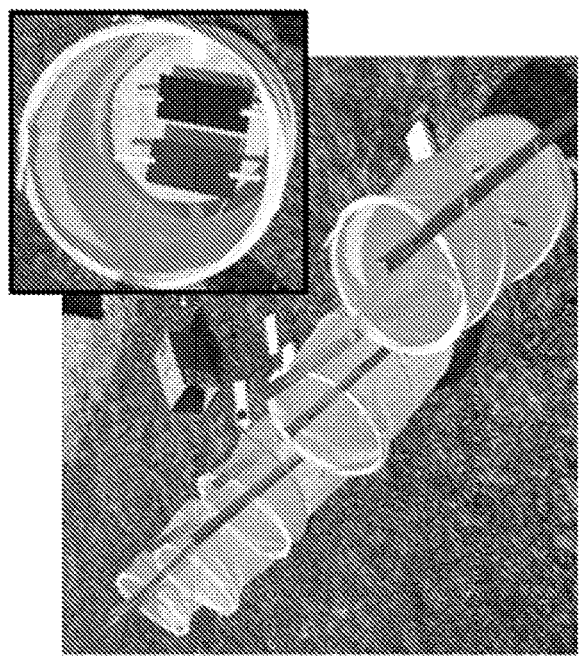
FIG. 5A shows the testing conditions for an outdoor evaluation of various cured coating layers.

As shown in FIG. 5A, several different cured coating layers were formed on aluminum substrates and exposed to direct sunlight on a 33° C. day. FIG. 5B illustrates the results from the outdoor evaluation shown in FIG. 5A, in which samples labeled with the Dow binder represent cured coating layers in accordance with certain embodiments of the invention.

Figure 6:
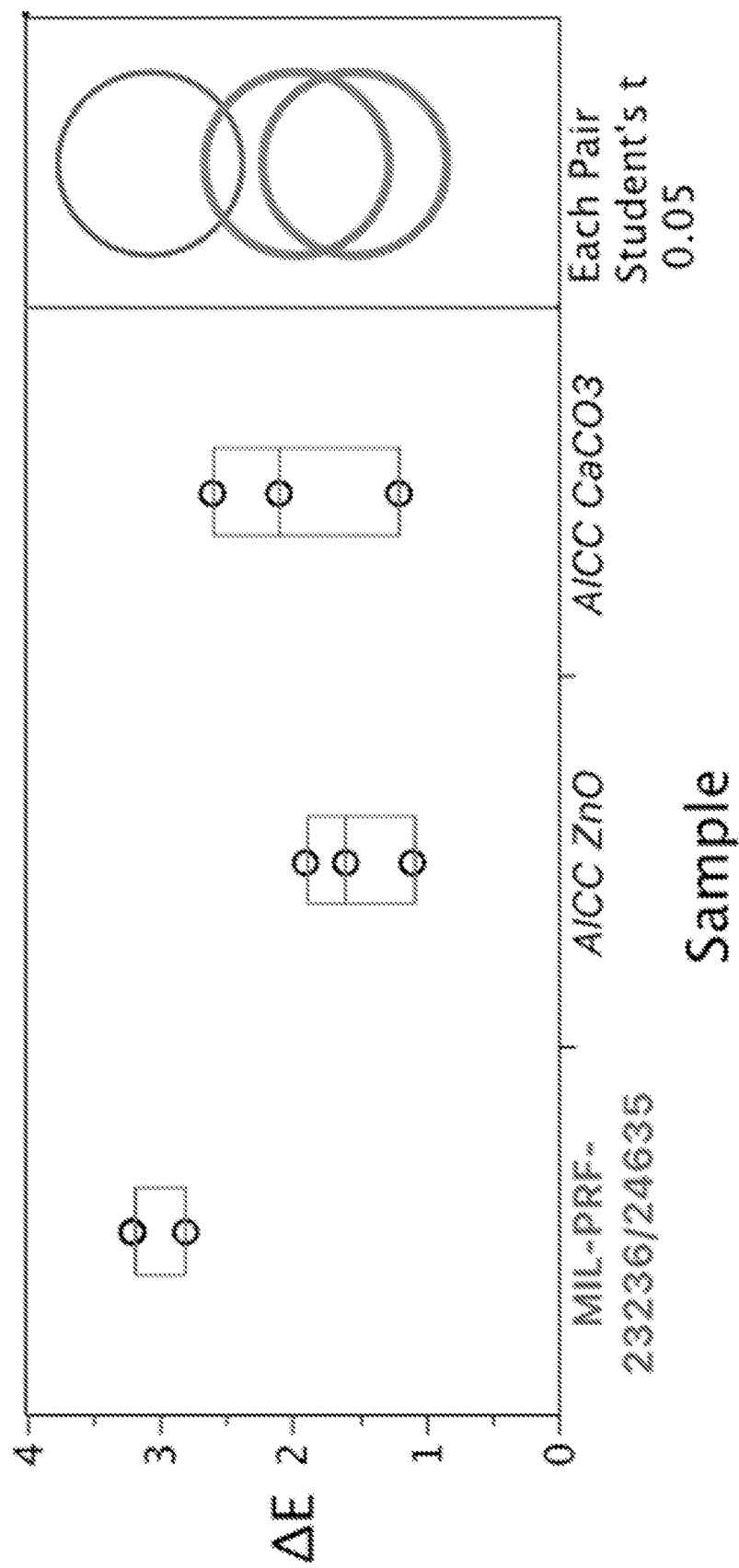
FIG. 6 illustrates color shift results for various cured coating layers.

FIG. 6 illustrates color shift results for a comparative cured coating layer (i.e., MIL-PRF-23236/24635) and two cured coating layers in accordance with certain embodiments of the invention (i.e., AlCC ZnO and AlCC CaCO$_3$), which demonstrated the smallest color shift in accordance with ASTM G154-16.

These and other modifications and variations to embodiments of the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A method of making a coating, the method comprising:
   (i) providing or forming a flowable coating composition comprising:
      (1) a binder comprising a first polymeric material comprising a first polysiloxane that (a) does not undergo ultraviolet (UV) degradation, (b) does not absorb UV radiation/light, or (c) both of (a) and (b); and
      a second polymeric material comprising a second polysiloxane that (a) does not undergo ultraviolet (UV) degradation, (b) does not absorb UV radiation/light, or (c) both of (a) and (b),
      where the first polysiloxane is different than the second polysiloxane; and
      (2) at least a first UV-reflective pigment dispersed throughout the binder, wherein the first UV-reflective pigment has an average diameter from about 0.3 to about 1 µm;
   (ii) coating a substrate with the flowable coating composition;
   (iii) curing the flowable coating composition to form a cured coating layer attached to the substrate;
   (iii) disposing an overcoat on top of the cured coating layer, the overcoat comprising calcium carbonate dispersed in a polysiloxane.

2. The method of claim 1, wherein the first polymeric material is devoid of an aromatic functionality.

3. The method of claim 1, wherein the first polymeric material comprises a methyl-polysiloxane.

4. The method of claim 1, wherein the first polysiloxane has a first structure and the second polysiloxane has a second structure, and wherein the second structure is more rigid than the first structure.

5. The method of claim 1, wherein the second polysiloxane is a polysilesquioxane having a cage structure, wherein the first polysiloxane imparts additional flexibility to the coating composition when the coating composition is provided in a cured form.

6. The method of claim 1, wherein the cured coating layer comprises from about 25% to about 60% by volume of the first polymeric material.

7. The method of claim 1, wherein the first polymeric material accounts for about 1% to about 100% of a total polymeric content of the cured coating layer.

8. The method of claim 1, wherein the first UV-reflective pigment comprises an inorganic pigment.

9. The method of claim 1, wherein the first UV-reflective pigment comprises ZnO, CaCO$_{3p}$, or a combination of ZnO and CaCO$_3$ in a ratio of x:y, where x may vary from 1 to 99, while y varies from 99 to 1.

10. The method of claim 1, further comprising dispersing at least a second UV-reflective pigment throughout the binder.

11. The method of claim 10, wherein the first UV-reflective pigment comprises ZnO and the second UV-reflective pigment comprises CaCO$_3$.

12. The method of claim 1, wherein the first UV-reflective pigment has an average diameter from about 0.3 to about 0.6 µm.

13. The method of claim 1, wherein the cured coating layer comprises from about 40% to about 75% by volume of the first UV-reflective pigment.

14. The method of claim 1, wherein the cured coating layer comprises a thickness from about 25 µm to about 250 µm.

15. The method of claim 1, wherein the coating has an average reflectance from about 80% to about 100% across wavelengths from about 0.4 µm to about 3 µm.

16. The method of claim 1, wherein the coating has an average reflectance from about 80% to about 100% across wavelengths from about 0.4 µm to about 2.5 µm.

17. The method of claim 1, wherein the cured coating layer is a hydrolysis reaction product of the first polysiloxane and the second polysiloxane.

18. The method of claim 1, wherein the first UV-reflective pigment comprises zinc oxide.

* * * * *